United States Patent Office 3,326,920
Patented June 20, 1967

3,326,920
SUBSTITUTED QUINOLIZINE OXIMES AND
PROCESS FOR THEIR PRODUCTION
Robert J. Stanaback, Morristown, Richard E. Brown, Hanover, and Robert I. Meltzer, Rockaway, N.J., assignors to Warner-Lambert Pharmaceutical Company, Morris Plains, N.J., a corporation of Delaware
No Drawing. Filed Apr. 27, 1965, Ser. No. 451,306
8 Claims. (Cl. 260—286)

This invention relates to novel substituted quinolizines and more particularly it relates to quinolizines of the formula:

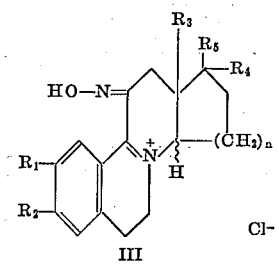 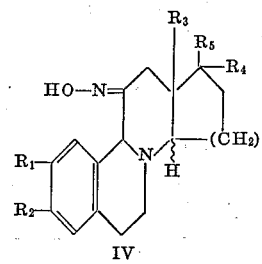

III  IV wherein $R_1$ and $R_2$ each represents hydrogen, hydroxy or lower alkoxy such as methoxy or methylene dioxy; $R_3$ represents hydrogen or lower alkyl of 1 to 6 carbon atoms such as methyl or ethyl; $R_4$ represents hydrogen, hydroxy or —$OR_6$ in which $R_6$ is an acyl radical of from 1 to 6 carbon atoms; $R_5$ represents hydrogen, lower alkyl of 1 to 6 carbon atoms, alkenyl such as vinyl, allyl, and the like, acyl such as acetyl, formyl, propionyl and the like,

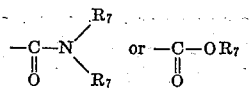

wherein $R_7$ is hydrogen or lower alkyl of 1 to 6 carbon atoms; or $R_4$ and $R_5$ taken together with the carbon atom to which they are attached represent a keto or cyclic ketal group such as

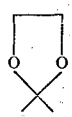

and $n$ is an integer of from 1 to 2.

The symbols $R_1$, $R_2$, $R_3$, $R_4$, $R_5$ and $n$ as used hereinafter have the same meaning as defined.

This invention also encompasses within its scope a novel process for the production of the above compounds as well as intermediates useful for their production.

The compounds of this invention exhibit interesting steriodal activities and are therefore useful in endocrine therapy. They also exhibit significant pharmacological activity on the cariovascular system, and anti-inflammatory activity. In use these compounds are combined with a nontoxic pharmaceutical carrier to form dosage forms such as tablets, suspensions, elixirs, capsules and the like. They may also be combined with other therapeutic agents such as analgesics, antibiotics, cardiovascular agents, tranquilizers or muscle relaxants to enhance and broaden their therapeutic spectrum. In addition, they are useful as intermediates for the production of other substituted quinolizines such as 11-amino substituted quinolizines.

The numbering of the compounds of this invention when $n$ is 2 is as follows:

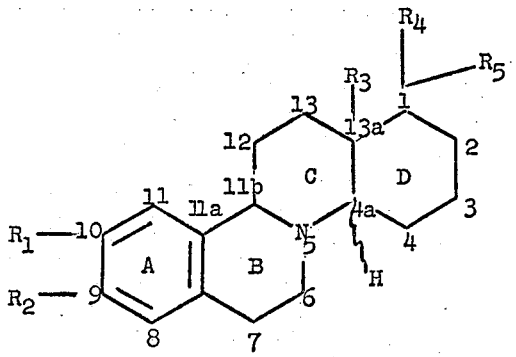

and when $n$ is 1 the numbering is as follows:

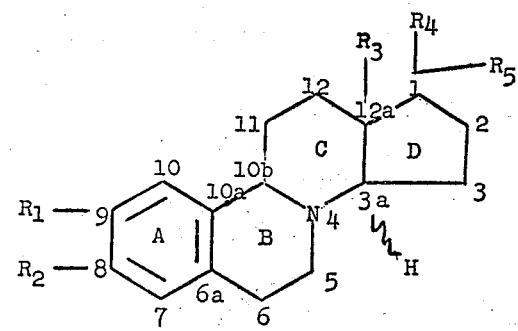

According to the process of this invention these novel compounds are prepared by reacting a quinolizine of the formula:

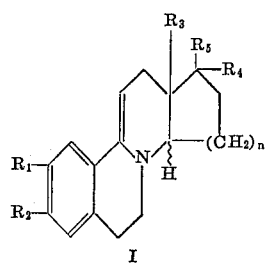

I with nitrosyl chloride to give an intermediate of the formula:

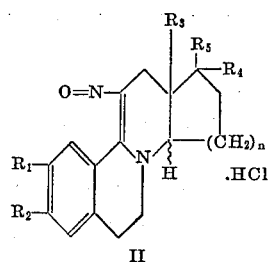

II

The above intermediate II undergoes rapid tautomerization in hydroxylic solvents such as water or low molecular weight alcohols such as methanol to form the oxime of the Formula III:

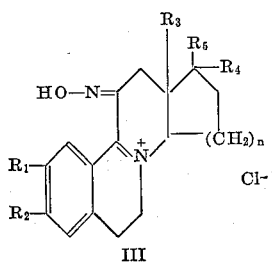

III

The starting quinolizine used in this reaction is described and prepared in accordance with the process set forth in application Ser. No. 248,872 filed Jan. 2, 1963. The starting materials for these quinolizines are keto lactams of Formula C below. These are prepared from $R_1$ and $R_2$ substituted phenylalkylamines of the general Formula A below and substituted ketoacids of the general Formula B in accordance with the process described in our copending application Ser. No. 318,190, filed Oct. 23, 1963. The $R_1$ and $R_2$ substituted phenylalkylamines such as 3,4-diethoxyphenylethylamines are well known compounds which are described in the literature, for example in Chemical Abstracts, vol. 56, page 10006g and by Ide et al. in J.A.C.S., vol. 59, page 726 (1937). When $R_1$ and $R_2$ are methylene dioxy, homopiperonylamine is used as starting material. This is described in Dictionary of Organic Compounds, Oxford University Press, 4th Edition, vol. I at page 132.

The ketoacids of Formula B are prepared according to the process described in our copending application Ser. No. 310,146, filed Sept. 19, 1963, using 2-$R_3$-cycloalkane-1,3-diones as starting material. Such 2-$R_3$-cycloalkane-1,3-diones are well known in the art and may be prepared according to the procedure of Panouse and Sannie published in Bull Soc. Chim. France, 1955, page 1036. See also H. Smith, J.C.S. 1964, page 4472.

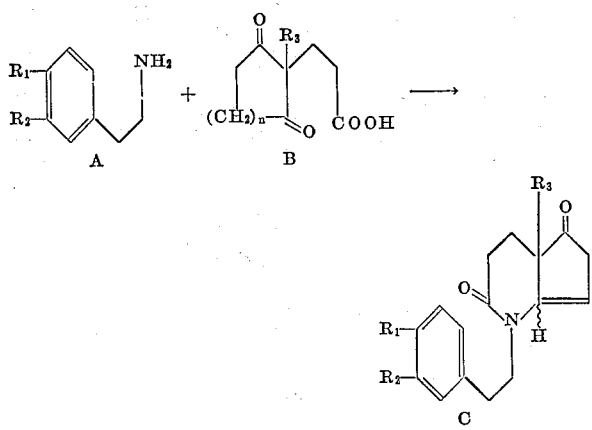

The keto lactam C is then treated with phosphorous oxychloride as described in said application Ser. No. 248,872.

The above-described nitrosation reactions of this invention are best carried out at low temperatures in inert solvents. A temperature range of from 30° C. down to −120° C. will suffice, however, the preferable temperature range is −50° C. to −78° C. Inert solvents useful in this reaction are, for example, ether, benzene, toluene, dichloromethane and the like.

The reaction is most conveniently carried out by adding slowly a solution of one molar equivalent of nitrosyl chloride dissolved in the inert solvent to a rapidly stirring solution of the quinolizine base in a suitable inert solvent and at the proper temperature. Under such conditions there is formed an immediate precipitate of adduct II, which can in some cases be removed by simple filtration. In other cases, the initial adduct is obtained in a form unsuitable for filtration. In such cases, the reaction product is best isolated by extraction with water, whereby the material is obtained in form III.

Finally, compounds of the type III may in turn be reduced to give saturated quinolizines of type IV:

IV

Such reduction reactions are best carried out through the use of a complex alkali metal borohydride such as sodium or potassium borohydride.

The following examples are included in order further to illustrate the invention.

EXAMPLE 1

*Trans-2,3,3a,5,6,11,12,12a-octahydro-11-keto-8-methoxy-1H-benzo[a]cyclopenta [f]quinolizinium chloride oxime*

A solution of 2.34 g. (9.1 mols) of trans-1,2,3,3a,5,6,12,12a - octahydro - 8 - methoxybenzo[a]cyclopenta[f] quinolizine in 200 ml. of anhydrous ether is cooled to −78° C. and treated dropwise with stirring with a solution of 0.067 g. of nitrosyl chloride in 100 ml. of anhydrous ether. The thick paste of yellow solid is allowed to warm up to 20° C. with stirring. The solid is filtered and recrystallized from ethanol to give trans-2,3,3a,5,6,11,12-12a - octahydro - 11 - keto-8-methoxy-1H-benzo[a]cyclopenta[f]quinolizinium chloride oxime as yellow crystals, M.P. 208°–210° C.

EXAMPLE 2

*Trans - 2,3,3a,5,6,11,12,12a-octahydro-11-keto-1-carbethoxy - 8 - methoxy - 12a-methyl-1H-benzo[a]cyclopenta [f]quinolizinium perchlorate oxime*

In the same way as described in Example 1, 2.82 g. of trans - 1,2,3,3a,5,6,12,12a - octahydro - 1-carbethoxy-8-methoxy - 12ª - methylbenzo[a] cyclopenta[f]quinolizine gives trans - 2,3,3a,5,6,11,12,12a - octahydro - 11 - keto-1-carbethoxy - 8 - methoxy - 12a - methyl - 1H - benzo[a] cyclopenta [f]quinolizinium perchlorate oxime by extraction of the ether suspension of the initial adduct with water and adding a slight excess of 10% perchloric acid solution. The product is recrystallized from ethanol and melts at 198°–200° C.

EXAMPLE 3

*Trans-1,2,3,3a,5,6,10b,11,12,12a-decahydro-8-methoxybenzo[a]cyclopenta[f]quinolizine-11-one oxime*

A solution of 3.0 g. of trans-2,3,3a-5,6,11,12,12a-octahydro - 11 - keto - 8-methoxy-1H-benzo[a]cyclopenta[f] quinolizinium chloride oxime in 100 ml. of ethanol is treated with 2.0 g. of potassium borohydride in small portions over a period of 2 hours at 20°–30° C. The mixture is filtered and the ethanol removed by distillation. The residue is partitioned between water and ether. The ether layer is dried over magnesium sulfate and the ether removed. The solid residue is recrystallized from acetonitrile to give trans-1,2,3,3a,5,6,10b,11,12,12a-decahydro - 8 - methoxybenzo[a]cyclopenta[f]quinolizine-11-one oxime as white crystals, M.P. 190°–193°C.

EXAMPLE 4

*Trans - 1,2,3,3a,5,6,10b,11,12,12a - decahydro - 1 - carbethoxy - 8 - methoxy - 12a-methylbenzo[a]cyclopenta[f]quinolizine-11-one oxime*

In the same way as described in Example 3, 2.0 g. of trans - 2,3,3a,5,6,11,12,12a - octahydro - 11 - keto - 1-carbethoxy-8-methoxy - 12a methyl - 1H - benzo[a]cyclopenta[f]quinolizinium perchlorate oxime gives trans-1,2,3,3a,5,6,11,12,12a - decahydro - 1-carbethoxy-8-methoxy-12a-methylbenzo[a]cyclopenta[f] - quinolizine - 11 - one oxime as white crystals, M.P. 193°–195° C. after recrystallization from ethanol.

It is understood that the foregoing detailed description is given merely by way of illustration and that many variations may be made therein without departing from the spirit of our invention.

Having described our invention, what we desire to secure by Letters Patent is:

1. A compound of the formula

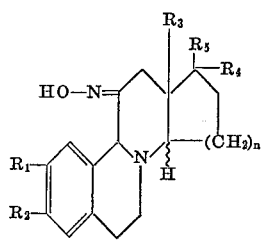

wherein $R_1$ and $R_2$ each is a member selected from the group consisting of hydrogen, hydroxy, lower alkoxy and methylene dioxy; $R_3$ is a member selected from the group consisting of hydrogen, methyl and ethyl; $R_4$ is a member of the group consisting of hydrogen, hydroxy and —$OR_6$ in which $R_6$ is acyl of a carboxylic acid and $R_4$ and $R_5$ taken together with the carbon atoms to which they are attached form a member of the group consisting of keto and cyclic ketal and $n$ is an integer of from 1 to 2.

2. A compound of the formula

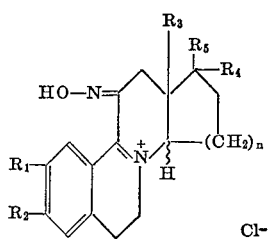

wherein $R_1$ and $R_2$ each is a member selected from the group consisting of hydrogen, hydroxy, lower alkoxy and methylene dioxy; $R_3$ is a member selected from the group consisting of hydrogen, methyl and ethyl; $R_4$ is a member of the group consisting of hydrogen, hydroxy and —$OR_6$ in which $R_6$ is acyl of a carboxylic acid and $R_4$ and $R_5$ taken together with the carbon atoms to which they are attached form a member of the group consisting of keto and cyclic ketal and $n$ is an integer of from 1 to 2.

3. Trans - 2,3,3a,5,6,11,12,12a - octahydro - 11 - keto - 1 - carbethoxy - 8 - methoxy - 12a - methyl - 1H - benzo[a]cyclopenta[f]quinolizinium perchlorate oxime.

4. Trans - 1,2,3,3a,5,6,10b,11,12,12a - decahydro - 8-methoxybenzo[a]cyclopenta[f]quinolizine-11-one oxime.

5. Trans - 1, 2,3,3a,5,6,10b,11,12,12a-decahydro-1-carbethoxy - 8 - methoxy - 12a - methylbenzo[a]cyclopenta[f]quinolizine-11-one oxime.

6. Trans - 2,3,3a,5,6,11,12,12a - octahydro - 11 - keto - 8 - methoxy - 1H - benzo[a]cyclopenta[f]quinolizinium chloride oxime.

7. Process for the production of a compound of the formula:

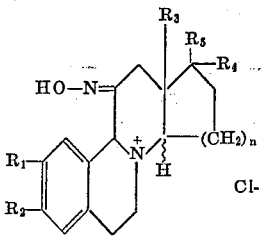

wherein $R_1$ and $R_2$ each is a member selected from the group consisting of hydrogen, hydroxy and lower alkoxy; $R_3$ is a member selected from the group consisting of hydrogen, methyl and ethyl; $R_4$ is a member of the group consisting of hydrogen, hydroxy and —$OR_6$ in which $R_6$ is an acyl of a carboxylic acid; $R_5$ is a hydrogen,

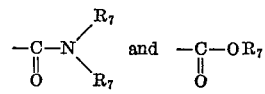

in which $R_7$ is hydrogen and $R_4$ and $R_5$ taken together with the carbon atoms to which they are attached form a member of the group consisting of keto and cyclic ketal and $n$ is an integer of from 1 to 2 which comprises contacting a compound of the formula:

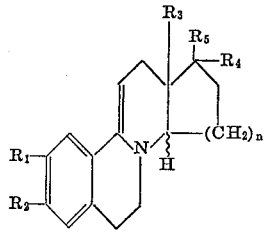

with nitrosyl chloride in an inert nonpolar solvent at low temperatures to form an intermediate of the formula:

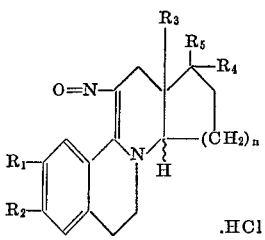

followed by recovering said intermediate from said solvent and contacting said intermediate with water or lower molecular weight alcohol.

8. A compound of the formula:

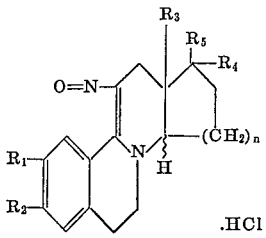

wherein $R_1$ and $R_2$ each is a member selected from the group consisting of hydrogen, hydroxy and lower alkoxy; $R_3$ is a member selected from the group consisting of hydrogen, methyl and ethyl; $R_4$ is a member of the group consisting of hydrogen, hydroxy and $-OR_6$ in which $R_6$ is an acyl of a carboxylic acid; $R_5$ is hydrogen,

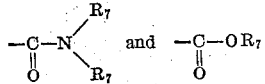

in which $R_7$ is hydrogen and $R_4$ and $R_5$ taken together with the carbon atoms to which they are attached form a member of the group consisting of keto and cyclic ketal and $n$ is an integer of from 1 to 2.

References Cited

Kanaoka, Chem. Pharm. Bull. vol. 7, p. 595 (1959).

ALEX MAZEL, *Primary Examiner.*

DONALD G. DAUS, *Assistant Examiner.*